(12) United States Patent
Yang

(10) Patent No.: US 7,591,045 B2
(45) Date of Patent: Sep. 22, 2009

(54) BUFFER APPARATUS FOR A CEILING SCREEN

(75) Inventor: Jeng-Ji Yang, Changhua (TW)

(73) Assignee: E-Lead Electronics Co., Ltd., Shengang Shiang (TW)

( * ) Notice: Subject to any disclaimer, the term of this patent is extended or adjusted under 35 U.S.C. 154(b) by 381 days.

(21) Appl. No.: 10/878,355

(22) Filed: Jun. 29, 2004

(65) Prior Publication Data

US 2006/0006093 A1  Jan. 12, 2006

(51) Int. Cl.
*E05F 1/08* (2006.01)
(52) U.S. Cl. ........................................................ 16/286
(58) Field of Classification Search ............... 16/50, 16/63, 64, 286, 289, 295, 308; 248/917–921; 348/837–839; 353/13
See application file for complete search history.

(56) References Cited

U.S. PATENT DOCUMENTS 4,756,051 A * 7/1988 Shy ............................... 16/50
6,424,386 B1 * 7/2002 Shimizu ...................... 348/837
6,608,749 B2 * 8/2003 Hubbard ...................... 361/683
6,883,206 B2 * 4/2005 Yang et al. ..................... 16/337
6,925,684 B2 * 8/2005 Kang et al. .................... 16/264
7,021,728 B2 * 4/2006 Donovan et al. ............. 312/7.2
2002/0085129 A1 * 7/2002 Kitazawa ..................... 348/837
2002/0149708 A1 * 10/2002 Nagata et al. ................ 348/837
2005/0205741 A1 * 9/2005 Chen ........................... 248/317

* cited by examiner

*Primary Examiner*—Robert J Sandy
*Assistant Examiner*—Ruth C Rodriguez
(74) *Attorney, Agent, or Firm*—Bacon & Thomas, PLLC

(57) ABSTRACT

A buffer apparatus for a ceiling screen includes a case and a lid pivotally coupled with one lateral end of the case for holding a screen. The lateral end has two sides forming a first action side and a second action side that correspond to each other. The first action side has a speed reducing mechanism to reduce the flipping speed of the lid and provide a buffer effect when the lid is driven by a first elastic element and unfolds. The second action side has a second elastic element compressed by the flipping lid at the initial unfolding stage during the buffering process, and expanded at a later unfolding stage of the lid to provide a returning elastic force to move and anchor the lid on a desired position. Thus the impact and vibration resulting from fast flipping of the lid may be prevented.

20 Claims, 11 Drawing Sheets

BUFFER APPARATUS FOR A CEILING SCREEN

BACKGROUND OF THE INVENTION

1. Field of the Invention

The present invention relates to a buffer apparatus for a ceiling screen that has a speed reducing mechanism on a first action side and a second action side corresponding to the first action side and an elastic element to provide buffer and traction to prevent impact and vibration caused by fast flipping or closing of the lid.

2. Description of the Prior Art

Nowadays equipping a multimedia player system in the car has become a growing trend. And the ceiling screen is the main stream used in the car (referring to FIG. 11). However, such type of ceiling screen has a big drawback, namely, the lid flips and turns very quickly. Impact and vibration frequently occurs and life span is affected.

SUMMARY OF THE INVENTION

In view of the aforesaid disadvantages, the object of the present invention is to provide a buffer apparatus for a ceiling screen that has a speed reducing mechanism on a first action side and a second action side corresponding to the first action side and an elastic element to provide buffer and traction to prevent impact and vibration caused by fast flipping or closing of the lid.

To achieve the aforesaid object, the buffer apparatus for a ceiling screen according to the invention includes a case which has a lateral end pivotally coupled with a lid that holds a screen, and a first action side and a second action side on two opposing sides of the lateral end that correspond to each other. The first action side has a speed reducing mechanism to decelerate and buffer the unfolding movement of the lid driven by a first elastic element. The second action side has a second elastic element which is compressed by buffering the opening thrust during the initial unfolding movement of the lid and provides a returning elastic force during expansion at the later unfolding stage to move the lid to a selected position for anchoring. Thus the impact and vibration caused by fast flipping or closing of the lid may be prevented.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
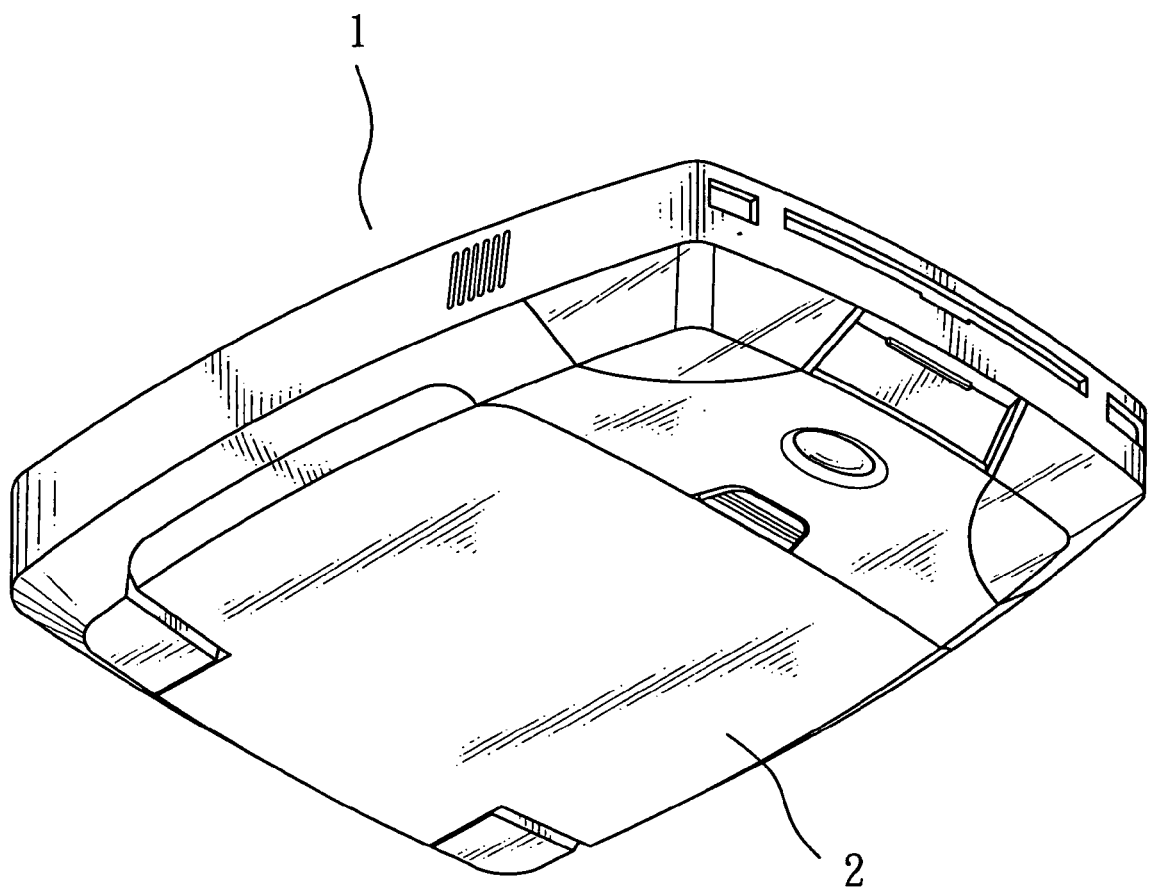
FIG. 1 is a perspective view of the invention.
Figure 2:
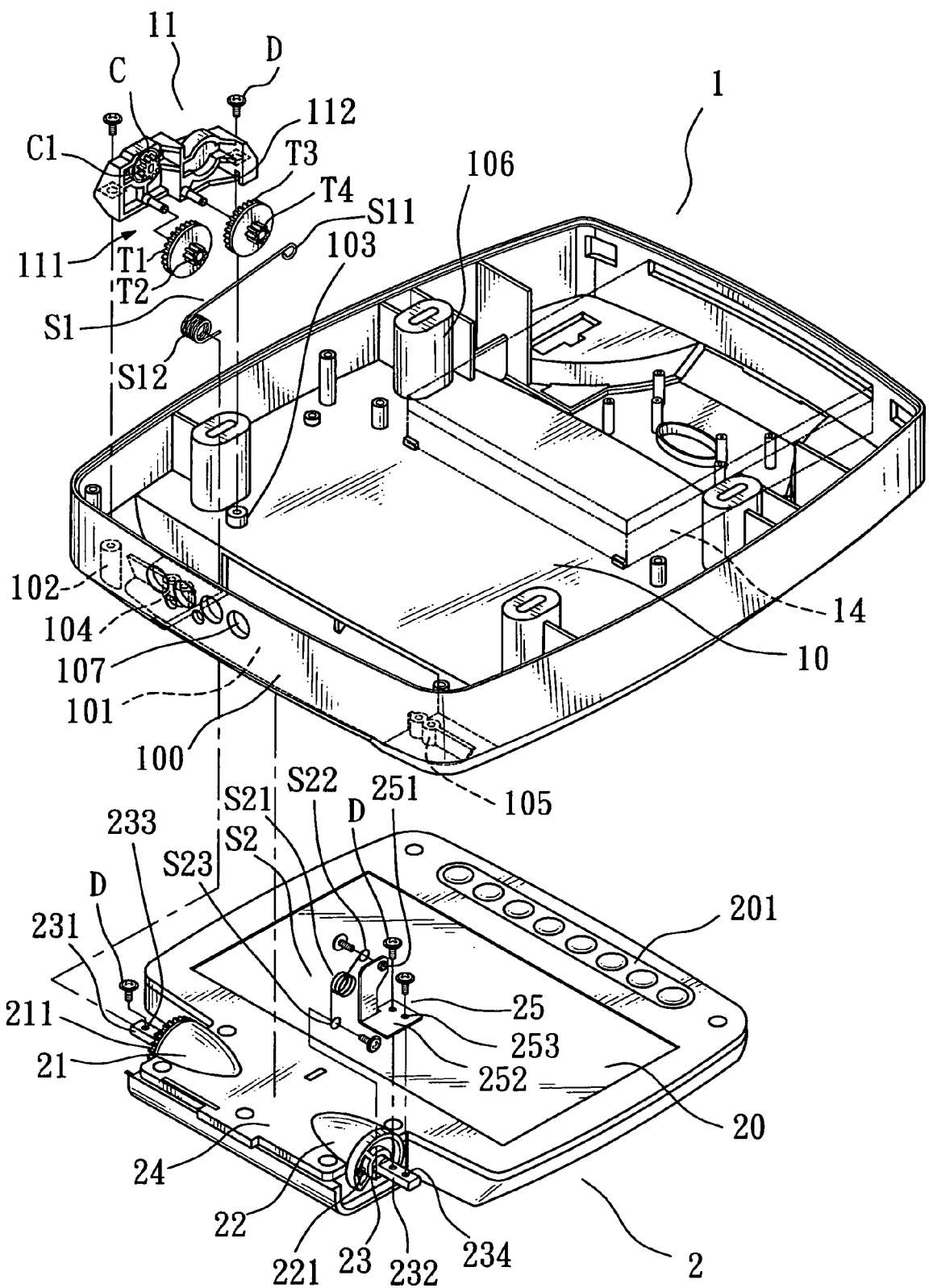
FIG. 2 is an exploded view of the invention.
Figure 3:
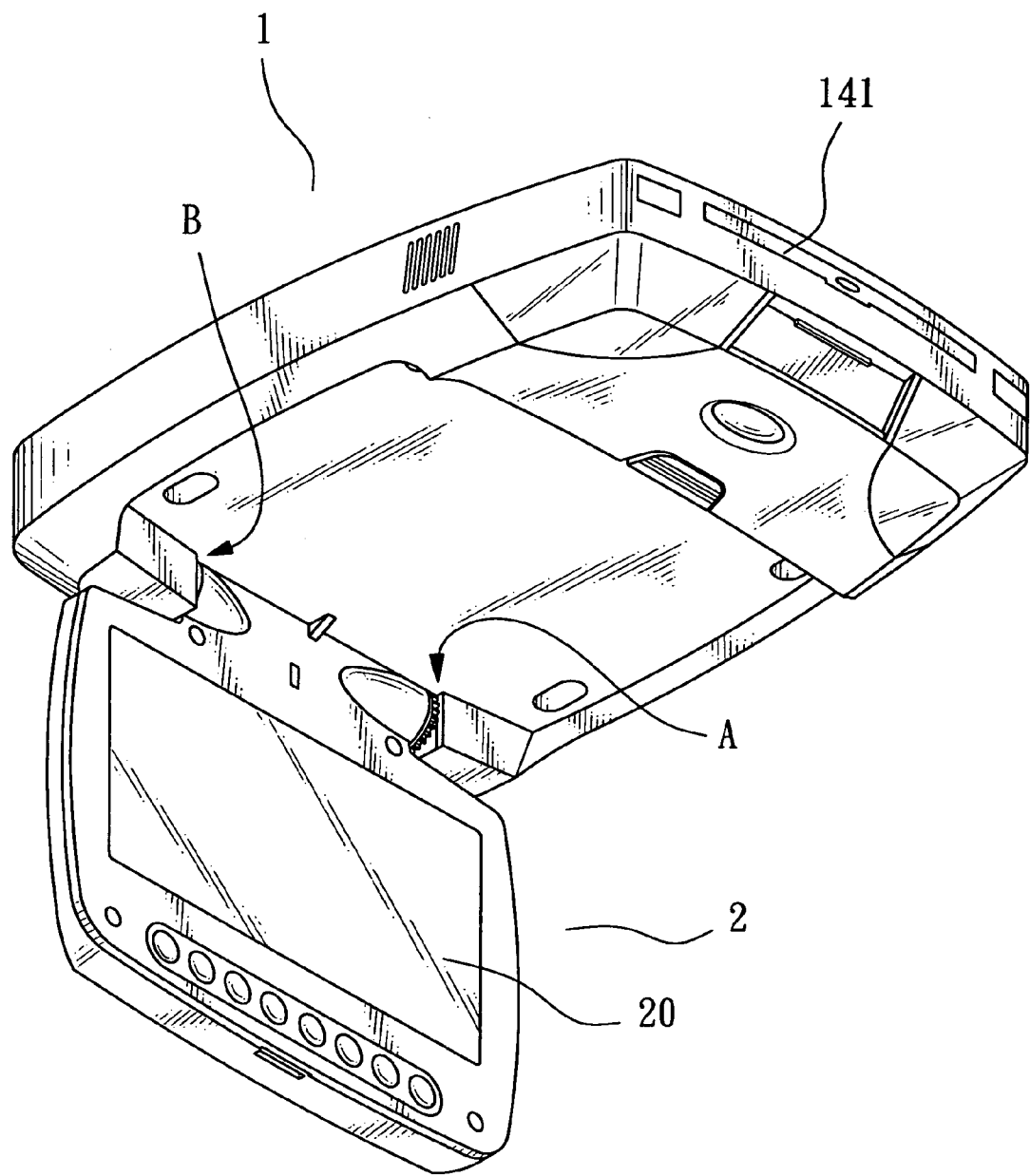
FIG. 3 is a perspective view of an embodiment of the invention.
Figure 4:
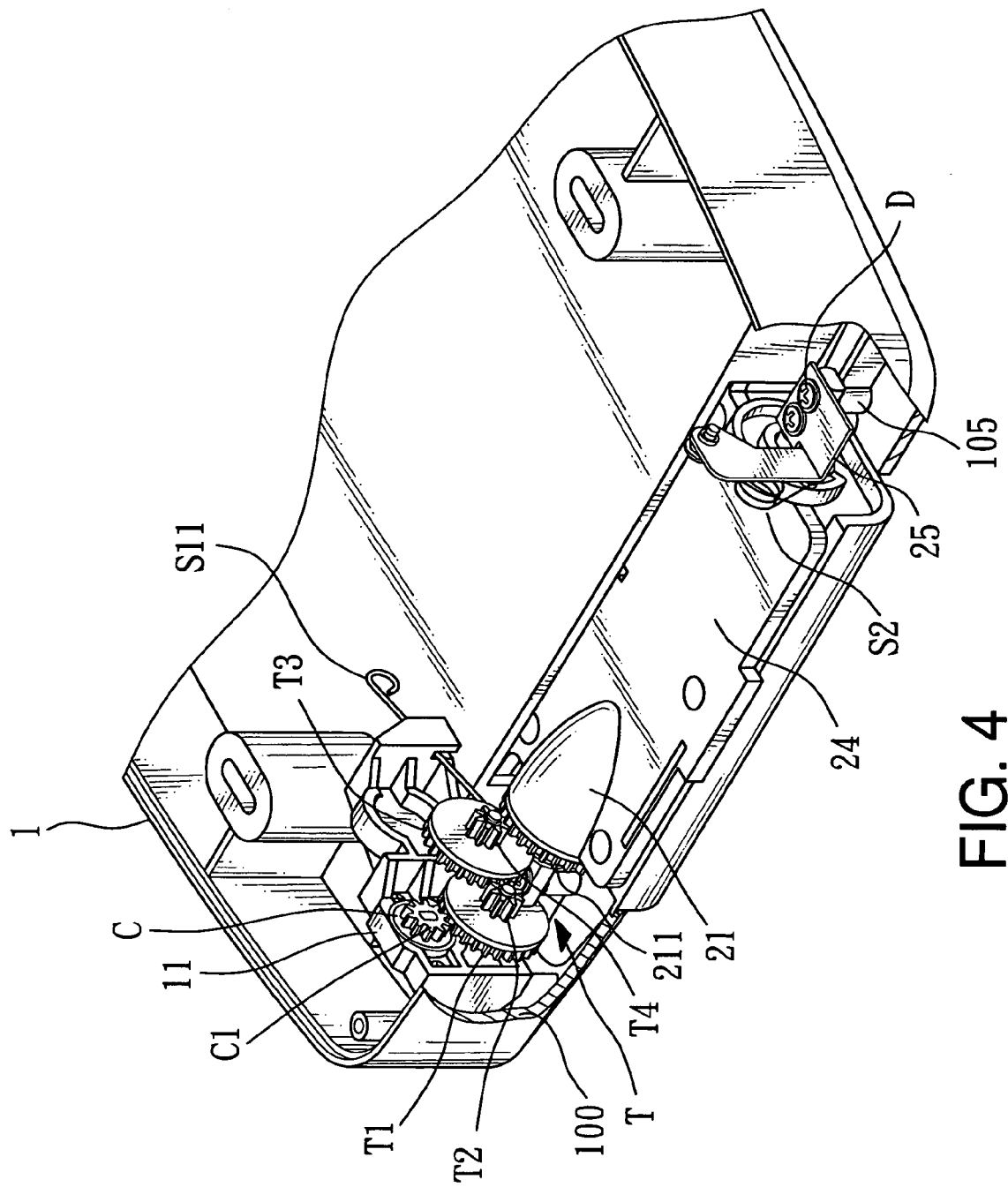
FIG. 4 is a fragmentary perspective view of an embodiment of the invention.

Referring to FIGS. 1 through 5, the buffer apparatus for a ceiling screen according to the invention includes a case 1 and a lid 2 pivotally coupled on a lateral end of the case 1. The lid 2 holds a screen 20. The case 1 has a housing compartment 10 and one lateral end 100 which has a transverse notch 101 to couple with a lateral end 24 of the lid 2. The lateral end 100 has a first action side A and a second action side B located on two sides corresponding to each other.

The first action side A includes:

a first bracing dock 11 located on an inner side of the lateral end 100 and is fastened to two struts 102 and 103 through screws D. The first bracing dock 11 holds a speed reducing mechanism 111 which consists of a damper C and a reducing gear set T;

a first axle seat 21 located on one side of the lateral end 24 of the lid 2 and has an axle gear 211 located on the periphery to engage with the reducing gear set T. The first axle seat 21 has a first axle bore 212 in the center to be run through by an axle 23. The axle 23 has a first axle end 231 extended outside the first axle seat 21. The first axle end 231 has at least one fastening hole 233 to receive a screw D for fastening to a corresponding strut 104 located in the case 1; and a first elastic element S1 to provide an elastic force to flip and unfold the lid 2. It has a leg end S11 wedged in a notch 112 formed on the first bracing dock 11, and a body S12 anchored on the first axle seat 21.

The second action side B includes:

a second axle seat 22 located on another side of the lateral end 24 of the lid 2 opposing the first axle seat 21. The second axle seat 22 has a second axle bore 222 (referring to FIG. 6) to be run through by the axle 23. The axle 23 has a second axle end 232 extended outside the second axle seat 22. The second axle end 232 has at least one fastening hole 234. The second axle seat 22 further has a screw hole 221 on an outer side close to the second axle bore 222;

a second bracing dock 25 corresponding to the first bracing dock 11. It has at least one fastening hole 251 on an upper section and a base plate 252 on a lower section with at least one fastening hole 253 formed thereon to receive a screw D for fastening to a corresponding strut 105 located in the case 1 through the fastening hole 234 on the second axle end 232; and a second elastic element S2 to buffer and draw the flipping lid 2 during unfolding. It has a helical body S21 in the center consisting of at least one coil and one distal end extended upwards to form a first leg end S22 to couple with a screw D for fastening to the fastening hole 251 of the second bracing dock 25 and another distal end extended downwards to form a second leg end S23 to couple with another screw D for fastening to the screw hole 221 of the second axle seat 22.

The damper C of the speed reducing mechanism 111 includes a damping gear C1 which engages with a first pinion T1 of the reducing gear set T, and drives a coaxial second pinion T2 which in turn engages with a third gear T3 to drive a coaxial fourth pinion T4. The fourth pinion T4 engages with the axle gear 211 of the first axle seat 21.

The case 1 has a plurality of fastening struts 106 to couple with bolts (not shown in the drawings) to fasten the case 1 to a car body. On one side of the case 1, there are a plurality of video and audio jacks 107 to input and output signals. The bottom of the case 1 has a control button 12 to drive a latch tongue 13 to control closing and anchoring of the lid 2.

The housing compartment 10 of the case 1 houses a video player 14. The front side of the case 1 has a window 141 to allow a disk tray to extend outwards (not shown in the drawings).

Figure 5:
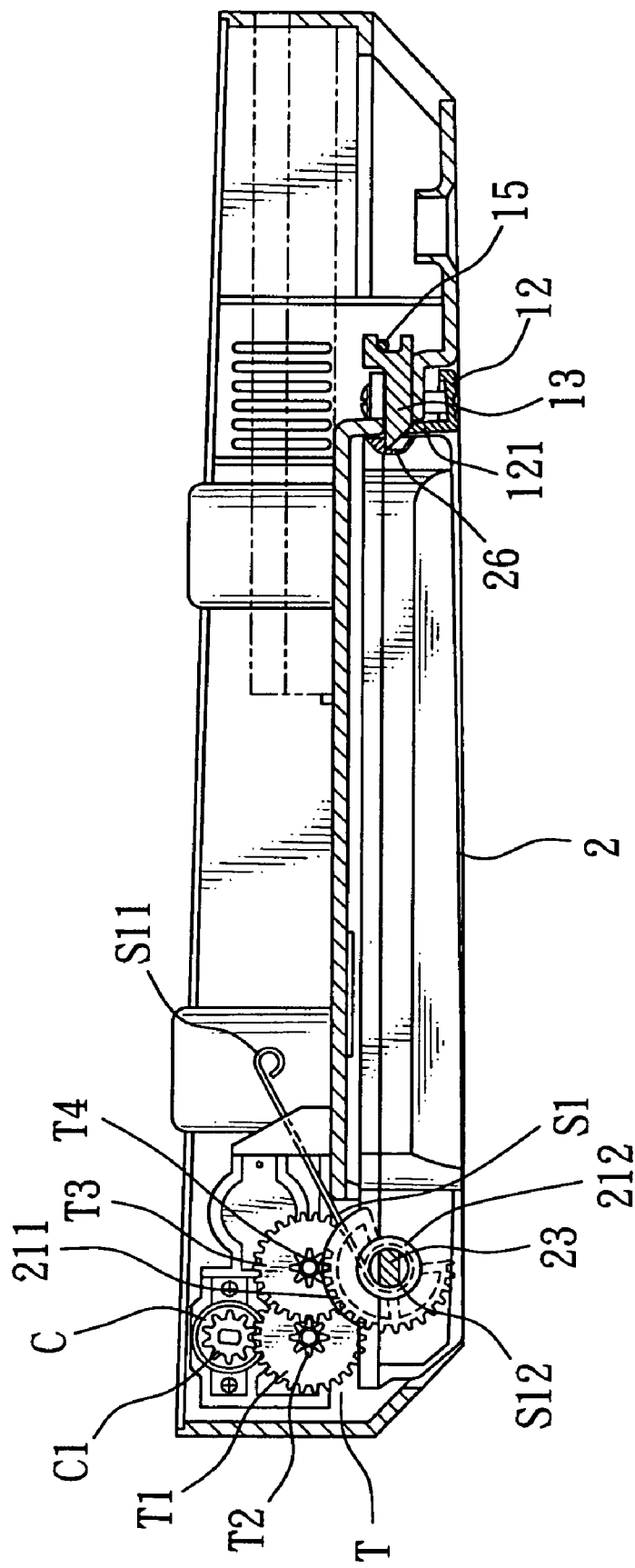
FIG. 5 is a sectional view of the invention in a folding condition.
Figure 6:
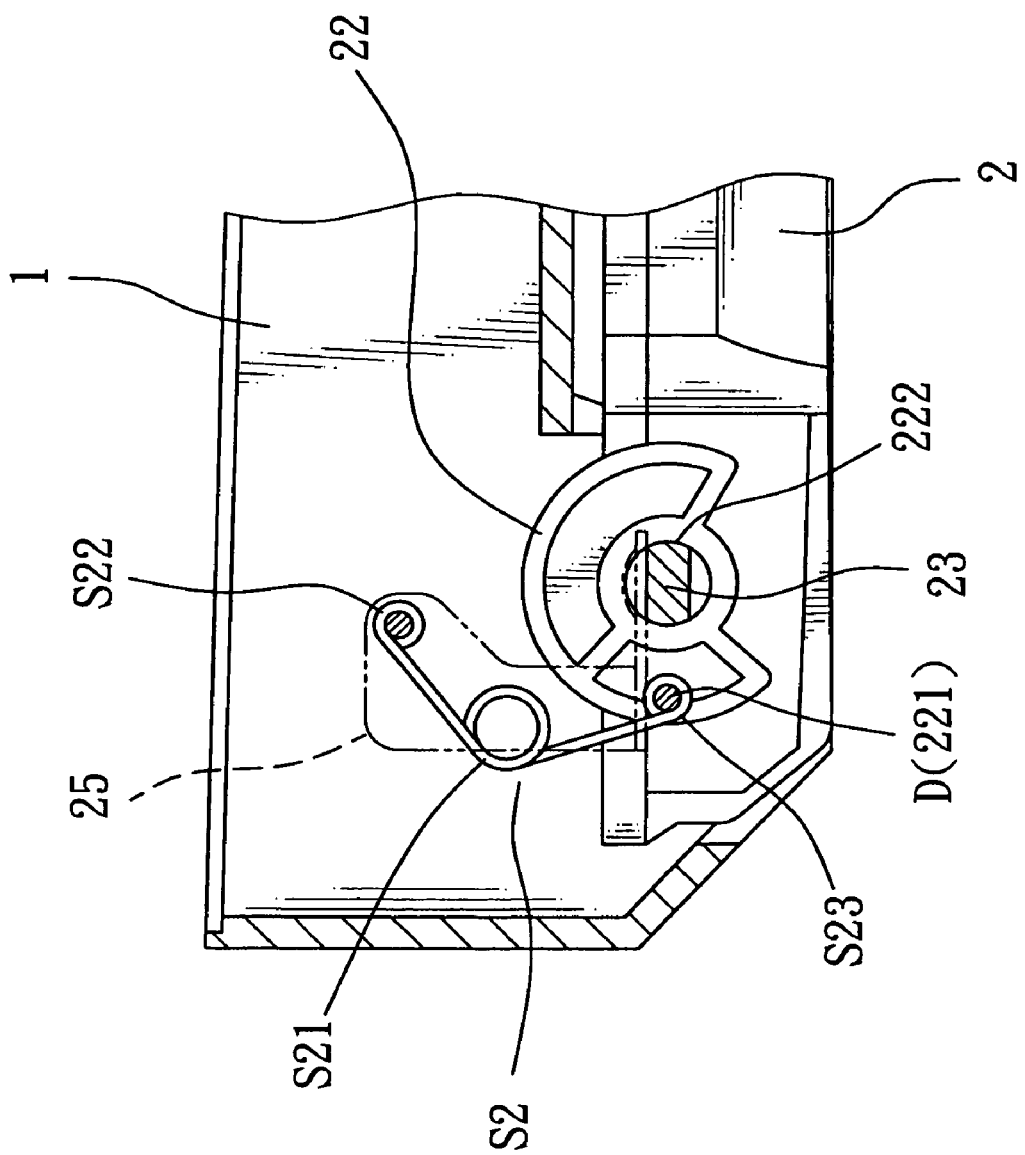
FIG. 6 is a schematic view of the second action side of the invention in operating condition-1.
Figure 7:
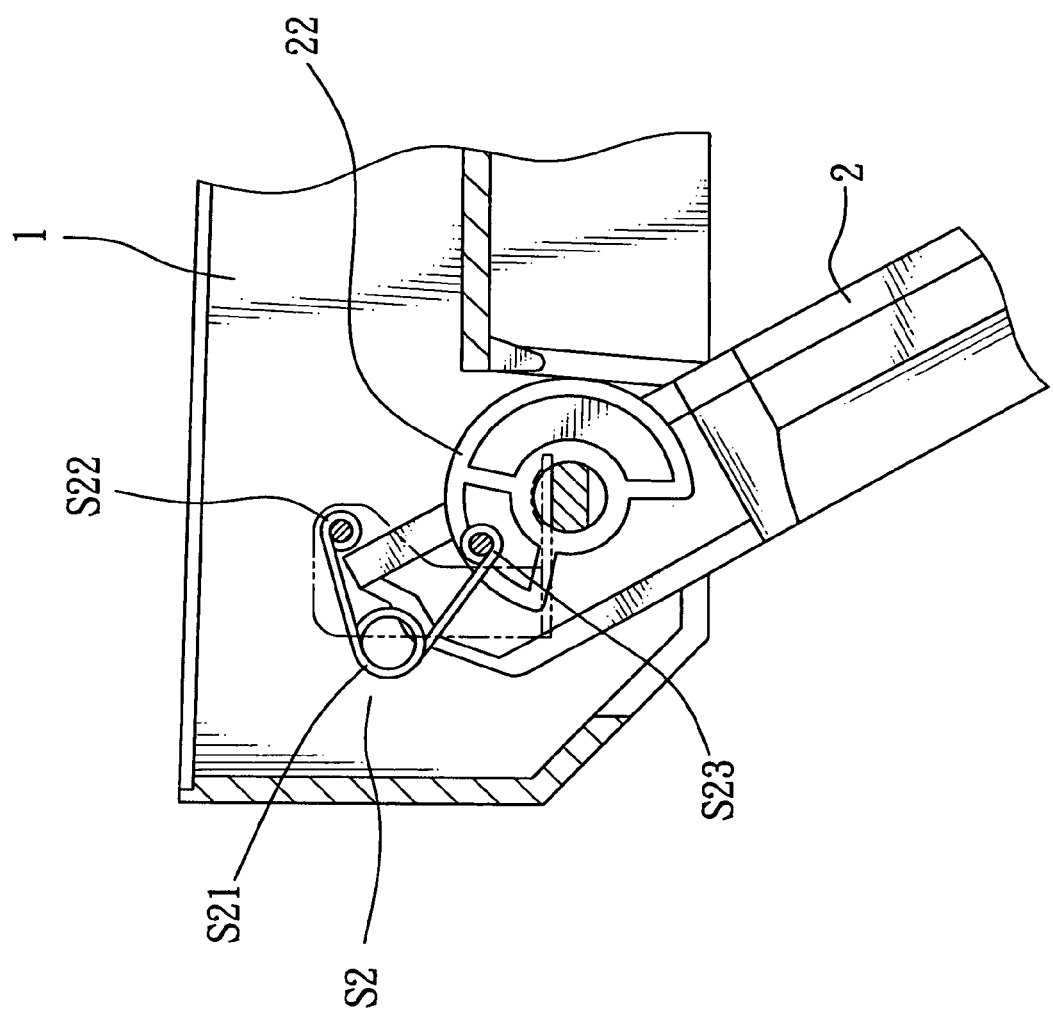
FIG. 7 is a schematic view of the second action side of the invention in operating condition-2.
Figure 8:
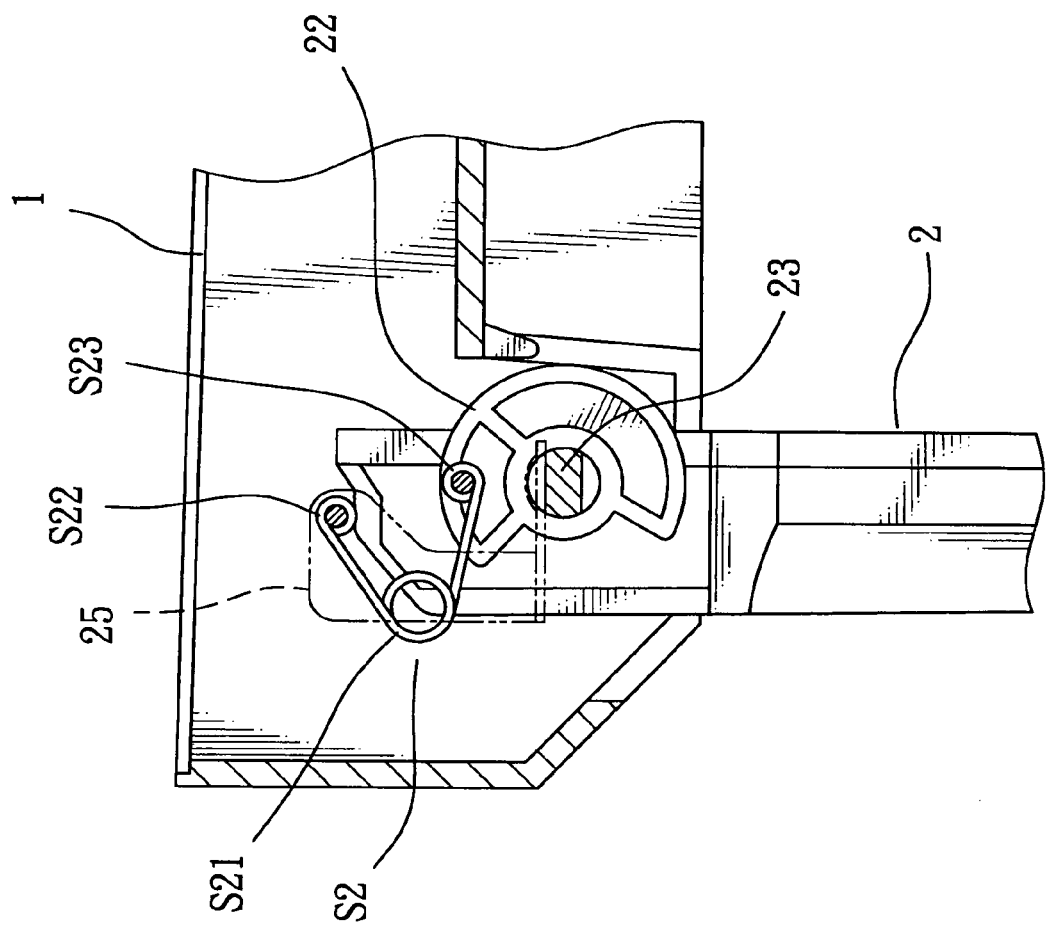
FIG. 8 is a schematic view of the second action side of the invention in operating condition-3.
Figure 9:
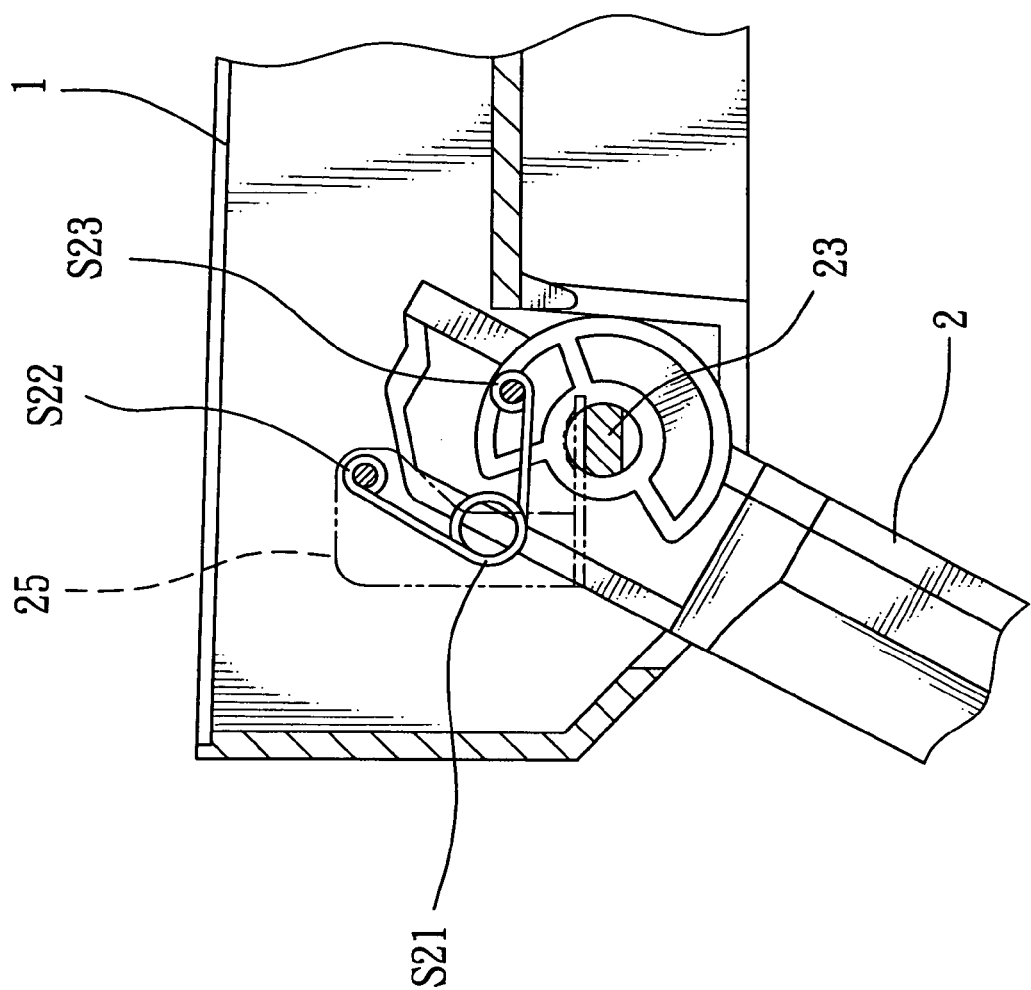
FIG. 9 is a schematic view of the second action side of the invention in operating condition-4.
Figure 10:
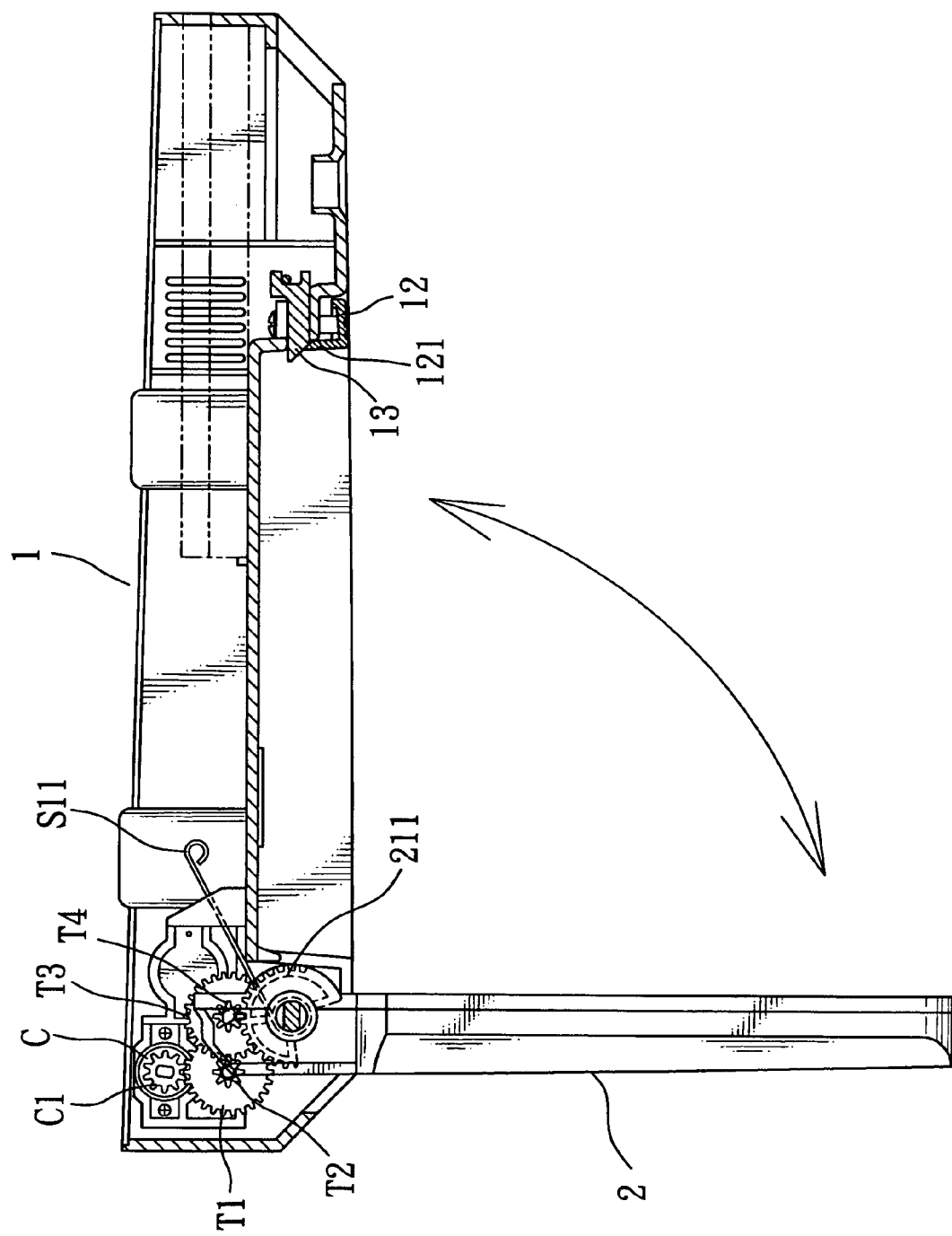
FIG. 10 is a sectional view of the invention in a unfolding condition.
Figure 11:
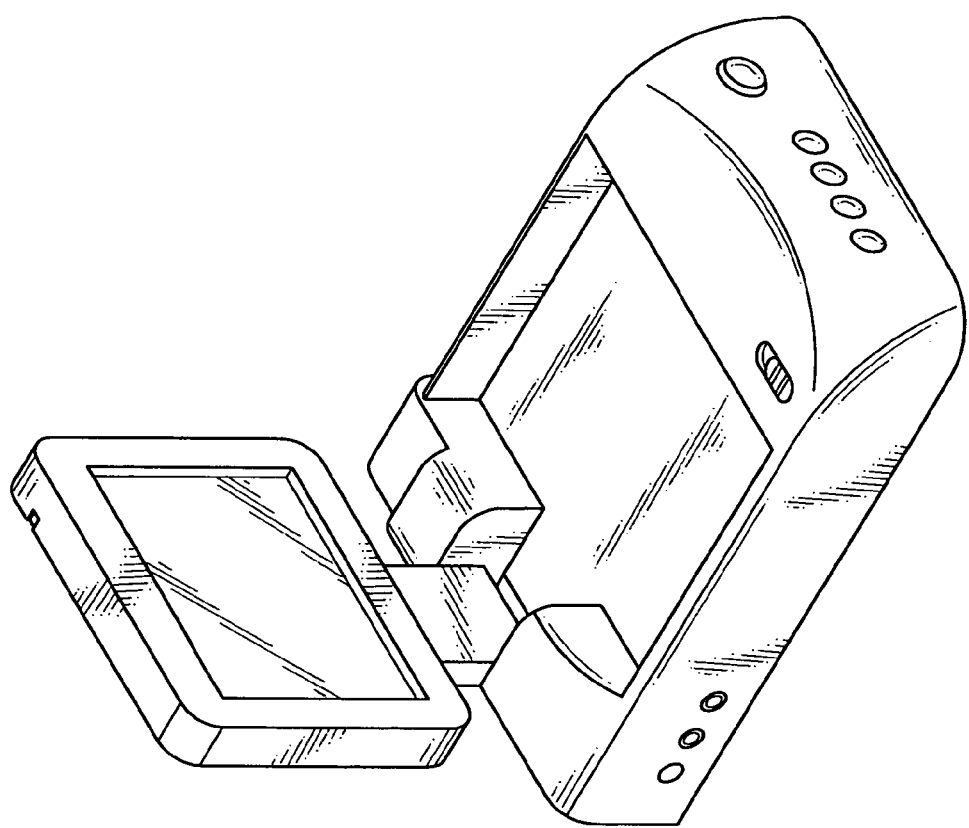
FIG. 11 is a perspective view of a conventional ceiling screen.

The lid 2 has a plate on an inner side to hold the screen 20. Its peripheral side has a button set 201. Referring to FIGS. 5, 6 and 10, when in use for seeing a video optical disk, depress the control button 12. It has a sloped rib 121 on one side to push the latch tongue 13 to retreat from a latch trough 26 to form a unfasten condition, and the lid 2 is urged by the returning elastic force of the first elastic element S1 and flips open; meanwhile the fourth pinion T4 engaged with the axle gear 211 is driven and turned by the flipping lid 2; consequently, the third gear T3, the second pinion T2, the first gear T1 and the damping gear C1 are driven and turned through the speed reducing gear set T. Thus the damping gear C1 turns at a faster speed and the damping force increases. As a result, a greater buffer force is generated to slow down the flipping speed of the lid 2. At the same time, the second elastic element S2 on the second action side B is actuated. At the initial unfolding stage of the lid 2 (referring to FIG. 7), the moving force of the lid 2 is augmented due to the elastic force of the first elastic element S1 and the gravity force resulting from the weight of the lid 2. Besides the buffering effect and speed reduction provided by the first action side A, the second elastic element S2 also bears the force and is compressed during the buffering process. When the lid 2 is unfolded to the vertical position (referring to FIG. 8), the elastic force of the first elastic element S1 decreases, and the gravity force prevents the lid 2 from moving upwards continuously. The buffering force of the second elastic element S2 also decreases, and is expanded outwards from the compressed condition. The expanded elastic force takes place at the later unfolding stage of the lid 2 (referring to FIG. 9) to move and anchor the lid 2 on a desired position so that passengers can see comfortably. To close the lid 2, just move and fold the lid 2 directly. The latch tongue 13 urged by a torsional spring 151 and extended outwards in normal conditions will be latched in the latch trough 26 to anchor the lid 2 in a closed condition.

In summary, the buffer apparatus for a ceiling screen according to the invention can prevent the lid from flipping or closing too rapidly, thus the strong impact and vibration that might otherwise occur to the case may be avoided.

I claim:

1. A buffer apparatus for a ceiling screen having a case and a lid pivotally coupled on one lateral end of the case, the lateral end having a first action side and a second action side on two sides thereof corresponding to each other, the buffer apparatus comprising:
    a first action side on one side of the lateral end having a speed reducing mechanism to reduce the flipping speed of the lid when unfolding by an elastic force of a first elastic element and provide a buffer effect when the lid is between a folded position and a vertical position; and
    a second action side on another side of the lateral end having a second elastic element compressed by flipping the lid at an initial unfolding stage between the folded position and the vertical position to provide a buffer effect, and expanded at a later unfolding stage to provide a returning elastic force to move and anchor the lid at a desired viewing position,
    wherein the first action side includes:
        a first bracing dock located on one side of the lateral end of the case to hold the speed reducing mechanism to reduce the flipping speed of the lid and provide the buffer effect;
        a first axle seat located on one side of a lateral end of the lid having a first axle bore to house an axle; and
        the first elastic element to provide the elastic force to unfold the lids
    wherein the axle has a first axle end extending outside the first axle seat, and
    wherein the first axle end has at least one first fastening hole to receive a screw to fasten the first axle end to at least one corresponding first strut of the case.

2. The buffer apparatus of claim 1, wherein the second action side includes:
    a second axle seat located on another side of the lateral end of the lid having a second axle bore to house the axle;
    a second bracing dock located on the case corresponding to the first bracing dock; and
    the second elastic element to provide buffer and traction for the flipping lid.

3. The buffer apparatus of claim 2, wherein the axle has a second axle end extending outside the second axle seat.

4. The buffer apparatus of claim 2, wherein the second elastic element has a helical body in the center consisting of at least one coil, one end extended upwards to from a first leg end to be fastened to a fastening hole located on an upper section of the second bracing dock, and another end extended downwards to form a second leg end to be fastened to a screw hole on the second axle seat.

5. The buffer apparatus of claim 1, wherein the speed reducing mechanism includes a damper and a speed reducing gear set.

6. The buffer apparatus of claim 5, wherein the damper includes a damping gear.

7. The buffer apparatus of claim 6, wherein the speed reducing gear set includes a first gear to engage with the damping gear.

8. The buffer apparatus of claim 1, wherein the first axle seat has an axle gear on the periphery to engage with a second gear of the speed reducing gear set.

9. A buffer apparatus for a ceiling screen having a case and a lid pivotally coupled on one lateral end of the case, the lateral end having a first action side and a second action side on two sides thereof corresponding to each other, the buffer apparatus comprising:
    a first action side on one side of the lateral end having a speed reducing mechanism to reduce the flipping speed of the lid when unfolding by an elastic force of a first elastic element and provide a buffer effect when the lid is between a folded position and a vertical position; and
    a second action side on another side of the lateral end having a second elastic element compressed by flipping the lid at an initial unfolding stage between the folded position and the vertical position to provide a buffer effect, and expanded at a later unfolding stage to provide a returning elastic force to move and anchor the lid at a desired viewing position,
    wherein the second action side includes:
        a second axle seat located on another side of the lateral end of the lid having a second axle bore to house the axle;
        a second bracing dock located on the case corresponding to the first bracing dock; and
        the second elastic element to provide buffer and traction for the flipping lid, wherein the axle has a second axle end extending outside the second axle seat, and wherein the second axle end has at least one second fastening hole to receive a screw to fasten the second axle end to at least one corresponding second strut of the case.

10. The buffer apparatus of claim 9, wherein the speed reducing mechanism includes a damper and a speed reducing gear set.

11. The buffer apparatus of claim 10, wherein the damper includes a damping gear.

12. The buffer apparatus of claim 11, wherein the speed reducing gear set includes a first gear to engage with the damping gear.

13. The buffer apparatus of claim 9, wherein the first elastic element has a leg end wedged in a notch formed on the first bracing dock and a body held in the first axle seat.

14. The buffer apparatus of claim 9, wherein the second elastic element has a helical body in the center consisting of at least one coil, one end extended upwards to from a first leg end to be fastened to a fastening hole located on an upper section of the second bracing dock, and another end extended downwards to form a second leg end to be fastened to a screw hole on the second axle seat.

15. A buffer apparatus for a ceiling screen having a case and a lid pivotally coupled on one lateral end of the case, the lateral end having a first action side and a second action side on two sides thereof corresponding to each other, the buffer apparatus comprising:

a first action side on one side of the lateral end having a speed reducing mechanism to reduce the flipping speed of the lid when unfolding by an elastic force of a first elastic element and provide a buffer effect when the lid is between a folded position and a vertical position; and a second action side on another side of the lateral end having a second elastic element compressed by flipping the lid at an initial unfolding stage between the folded position and the vertical position to provide a buffer effect, and expanded at a later unfolding stage to provide a returning elastic force to move and anchor the lid at a desired viewing position, wherein the first action side includes:

a first bracing dock located on one side of the lateral end of the case to hold the speed reducing mechanism to reduce the flipping speed of the lid and provide the buffer effect;

a first axle seat located on one side of a lateral end of the lid having a first axle bore to house an axle; and the first elastic element to provide the elastic force to unfold the lid, and wherein the first elastic element has a leg end wedged in a notch formed on the first bracing dock and a body held in the first axle seat.

16. The buffer apparatus of claim 15, wherein the second action side includes:

a second axle seat located on another side of the lateral end of the lid having a second axle bore to house the axle;

a second bracing dock located on the case corresponding to the first bracing dock; and the second elastic element to provide buffer and traction for the flipping lid.

17. The buffer apparatus of claim 15, wherein the speed reducing mechanism includes a damper and a speed reducing gear set.

18. The buffer apparatus of claim 17, wherein the damper includes a damping gear.

19. The buffer apparatus of claim 18, wherein the speed reducing gear set includes a first gear to engage with the damping gear.

20. The buffer apparatus of claim 15, wherein the first axle seat has an axle gear on the periphery to engage with a second gear of the speed reducing gear set.

* * * * *

UNITED STATES PATENT AND TRADEMARK OFFICE
CERTIFICATE OF CORRECTION

PATENT NO. : 7,591,045 B2 Page 1 of 1
APPLICATION NO. : 10/878355
DATED : September 22, 2009
INVENTOR(S) : Jeng-Ji Yang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 597 days.

Signed and Sealed this

Fourteenth Day of December, 2010

David J. Kappos
*Director of the United States Patent and Trademark Office*